United States Patent [19]

Hughes

[11] 4,270,206
[45] May 26, 1981

[54] TRANSCEIVER FOR PHASE-SHIFT MODULATED CARRIER SIGNALS

[75] Inventor: William C. Hughes, Scotta, N.Y.

[73] Assignee: General Electric Company, Schenectady, N.Y.

[21] Appl. No.: 124,347

[22] Filed: Feb. 25, 1980

[51] Int. Cl.³ .............................................. H04L 27/18
[52] U.S. Cl. .......................................... 375/9; 455/76; 340/310 A
[58] Field of Search ................ 375/9, 52, 57, 58, 106, 375/114; 455/76, 73; 370/100, 12; 340/310 R, 310 A; 179/2 DP

[56] References Cited

U.S. PATENT DOCUMENTS

| 3,944,723 | 3/1976 | Fong | 178/3 |
|---|---|---|---|
| 3,944,932 | 3/1976 | Fong | 455/307 |
| 3,973,087 | 8/1976 | Fong | 179/170 R |
| 3,973,240 | 8/1976 | Fong | 340/151 |
| 4,087,677 | 5/1978 | Dunn et al. | 375/9 |
| 4,101,834 | 7/1978 | Stutt et al. | 340/310 A |
| 4,109,204 | 8/1978 | Kincaid et al. | 375/58 |
| 4,135,181 | 1/1979 | Bogacki et al. | 340/310 A |
| 4,161,720 | 7/1979 | Bogacki | 340/150 |
| 4,199,809 | 4/1980 | Pasahow | 375/9 |

Primary Examiner—Benedict V. Safourek
Attorney, Agent, or Firm—Geoffrey H. Krauss; Marvin Snyder; James C. Davis

[57] ABSTRACT

A transceiver for a phase-shift-modulated carrier data communications system, includes a digital-data-recovering receiver having relatively wide band-pass filters and a complimentary integrate-and-dump data detector. A pseudo-bandpass-filtered, modulated-carrier synthesizer provides a transmission signal, under control of a frequency-arithmetic multiple-frequency synthesizer, which is also utilized to provide all required frequencies to the receiver mixers and band synchronization circuitry. All transceiver frequencies are locked to the instantaneous frequency of a system-wide signal.

30 Claims, 4 Drawing Figures

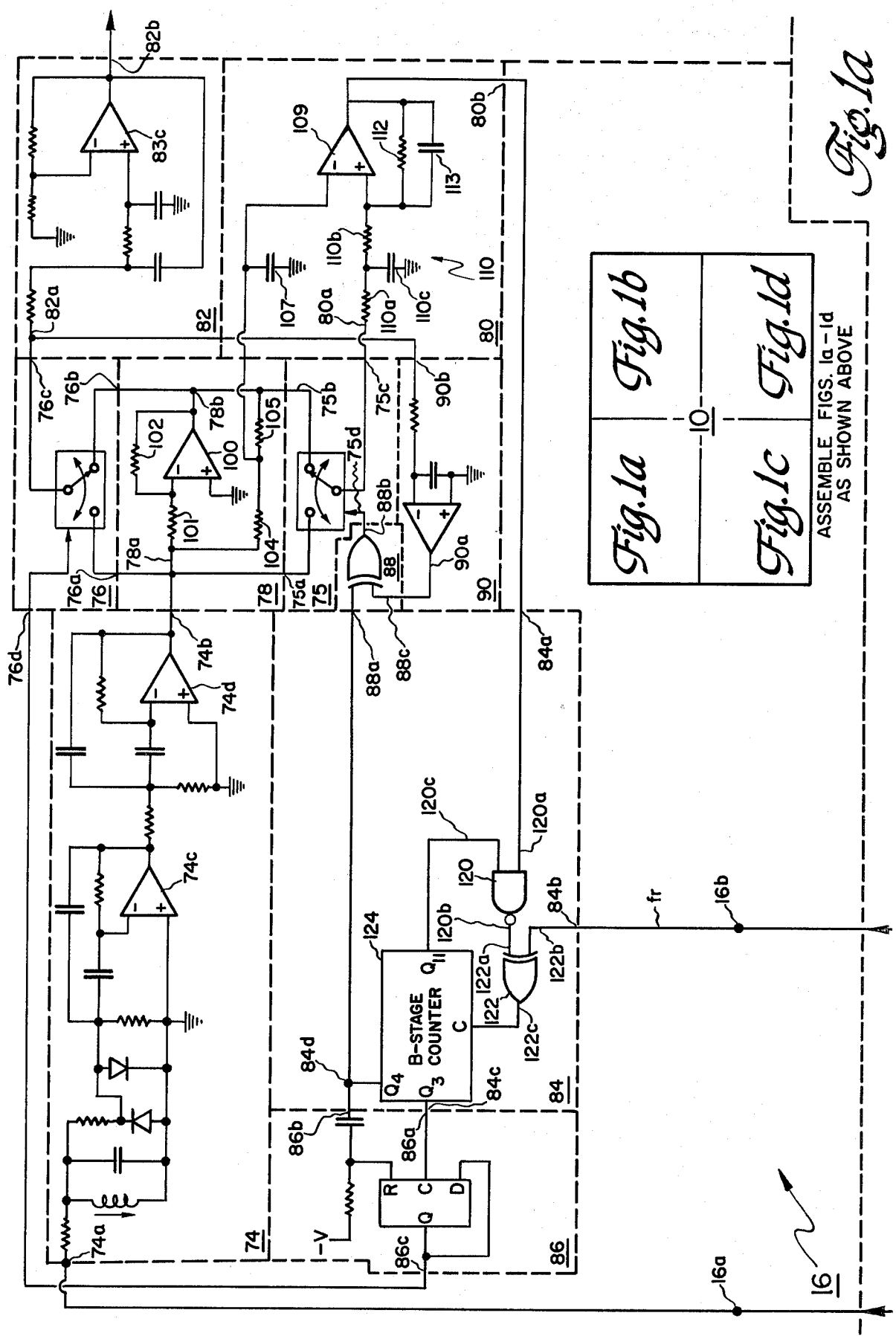

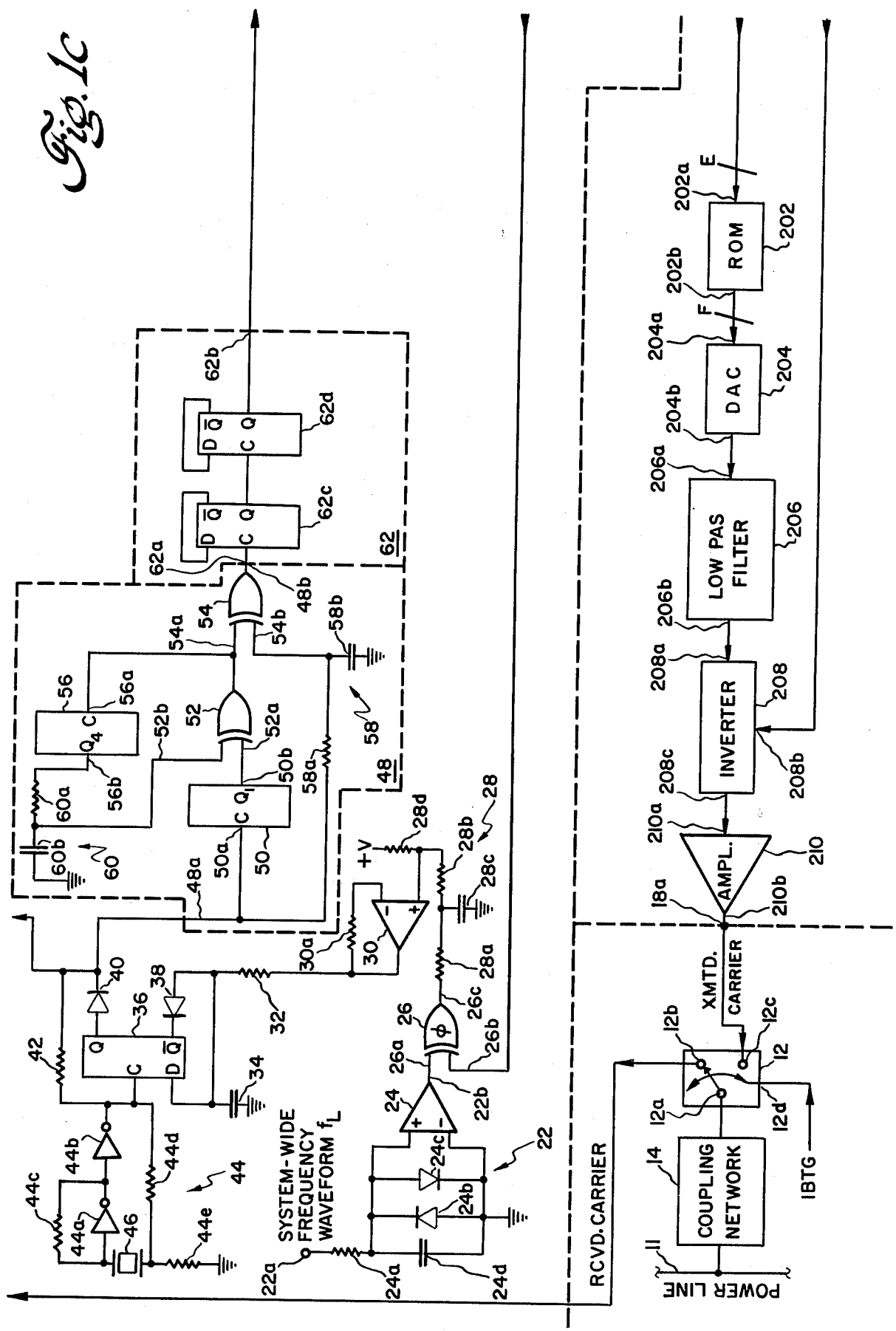

4,270,206

TRANSCEIVER FOR PHASE-SHIFT MODULATED CARRIER SIGNALS

BACKGROUND OF THE INVENTION

The present invention relates to digital communications systems and, more particularly, to a novel transceiver for transmitting and receiving data by phase-shift-modulation of a communications system carrier waveform.

It is well-known that communications systems may transfer digital information from one location to another location by means of a carrier having the phase thereof shifted in accordance with the value of each of a sequence of data bits. Typically, a phase-shift modulation communications system may invert the phase of the carrier waveform, i.e. phase-shift modulation by 180°, during each bit time interval in which a first binary data value is to be transmitted, and maintain the carrier waveform phase of the immediately preceding bit time interval, when a remaining binary data value is to be sent in a particular bit time interval. It is also known that transmission of digital information may occur utilizing a powerline as the transmission medium between a central facility and a multiplicity of remote locations each tied to the power distribution network. Powerline communication systems of this type are disclosed and claimed in U.S. Pat. Nos. 3,973,087 and 3,973,240, both issued Aug. 3, 1976; U.S. Pat. No. 3,944,723, issued Mar. 16, 1976; U.S. Pat. No. 4,135,181, issued Jan. 16, 1979; and U.S. Pat. No. 4,161,720, issued July 17, 1979, all assigned to the assignee of the present application and all incorporated herein in their entirety by reference. In powerline communication systems, wherein a powerline frequency (typically 60 Hertz (Hz.) in the United States) signal is present throughout the entire system, it is also known that the signal-to-noise ratio of the received signal can be greatly improved if the transmitted carrier signal frequencies are odd multiples of the first sub-harmonic of the powerline frequency. Methods and apparatus for realizing such improvements in signal-to-noise ratio are described and claimed in U.S. Pat. No. 4,101,834, issued July 18, 1978; and U.S. Pat. No. 4,109,204, issued Aug. 22, 1978, both assigned to the assignee of the present invention and incorporated herein by reference in their entirety.

Present concepts for automatic meter reading and control systems, in which each power-consuming location (a residence, office building, factory and the like) can be controlled and monitored, require that a meter terminal unit (MTU) be capable of both receiving control information from a central location and of transmitting power consumption information back to the central location upon request. Thus, in addition to received-data-processing and sensed-data-formatting apparatus, each MTU will desirably include a transceiver capable of receiving the phase-shift-modulated carrier from the central location for recovery of control data and of transmitting a phase-shift-modulated carrier back to the central location for conveying data thereto. As the number of MTUs required for even a moderately sized power distribution network can number in the hundreds of thousands, a relatively low cost transceiver, having a reduced complexity, is highly desirable.

BRIEF SUMMARY OF THE INVENTION

In accordance with the invention, a transceiver for phase-shift modulated carrier signals includes a carrier-receiving data recovery section, a carrier-synthesizing data transmitting section and a frequency synthesis section providing all of the waveforms, having frequencies locked to the instantaneous frequency of a system-wide frequency, required by both the receiving and transmitting sections. The receiver section includes input bandpass filtering and dual linear mixers, with one mixer forming a portion of a phase-locked loop controlling the frequency of the injection signal to the mixers, and with the other mixer providing a baseband signal for driving a symmetrical integrate-and-dump data detector and tracking baud synchronization circuit. The transmitter section receives a single clock signal, locked to the system-wide frequency waveform, for synthesizing a 180° phase-shift-modulated pseudo-bandpass-filtered carrier waveform. The shared frequency synthesis section utilizes a crystal-controlled oscillator to provide a frequency which is processed by frequency-arithmetic circuitry to provide all of the receiver and transmitter section waveforms at frequencies locked to the frequency of the system-wide waveform.

In one presently preferred embodiment, the frequency-synthesis section utilizes a pulse-swallow circuit to reduce the frequency of the crystal oscillator in accordance with an error signal, of magnitude responsive to the error between the system-wide waveform frequency and the divided output of a phase-locked loop controlled by the pulse-swallow circuit output, whereby all frequencies in the loop are locked to the system-wide waveform frequency. A sub-loop, including a phase detector, voltage-controlled oscillator and frequency divider, is utilized to provide a symmetrical square-wave output waveform at one or more desired output frequencies, even though the pulse-swallow circuitry provides a non-symmetric waveform.

Accordingly, it is an object of the present invention to provide a transceiver for a phase-shift modulated digital communication system.

This and other objects of the present invention will become apparent upon consideration of the following detailed description, when taken in conjunction with the drawings.

BRIEF DESCRIPTION OF THE DRAWINGS

FIGS. 1a–1d are coordinated portions of a schematic diagram of the novel transceiver of the present invention.

DETAILED DESCRIPTION OF THE INVENTION

Figure 1B:
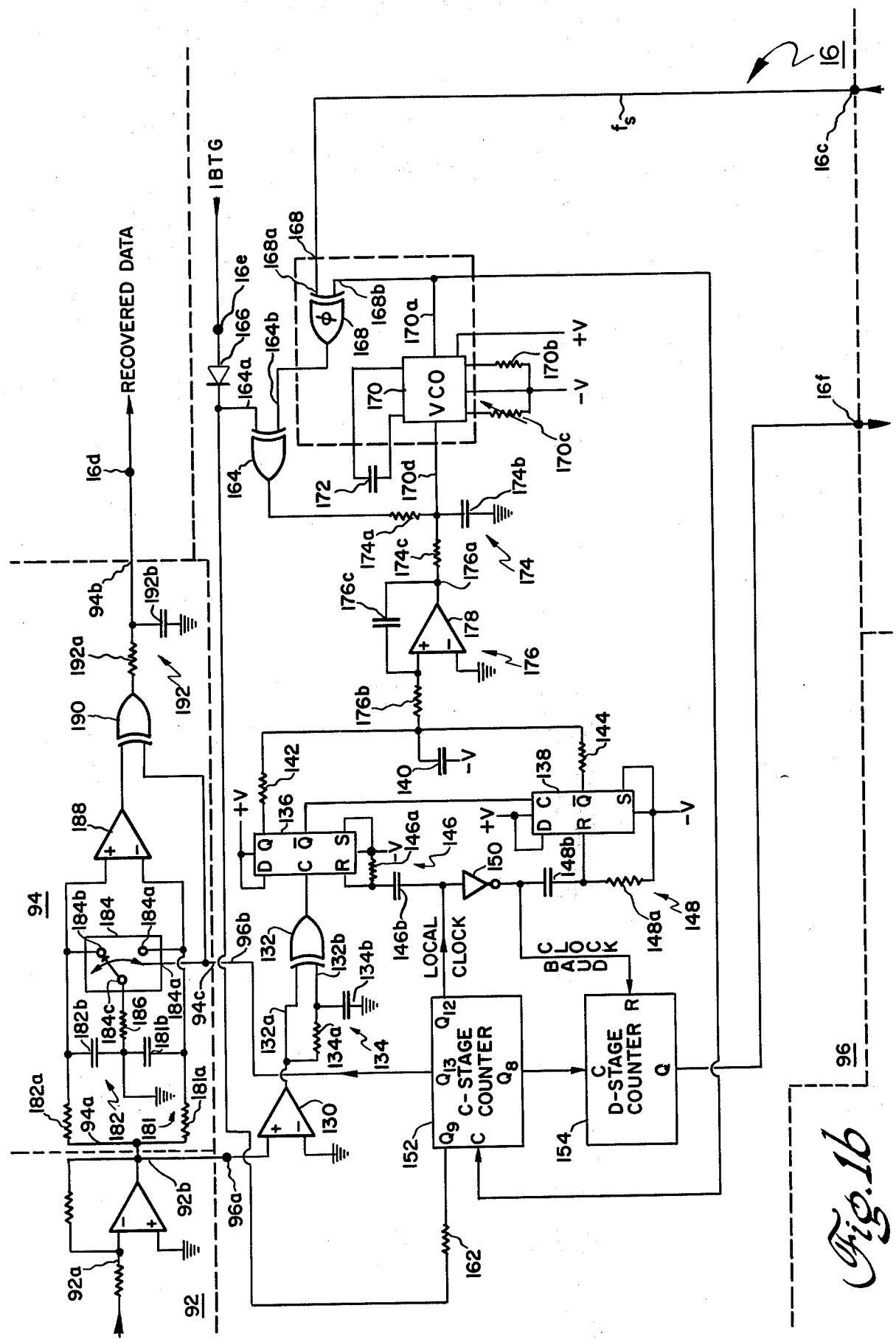
Figure 1D:
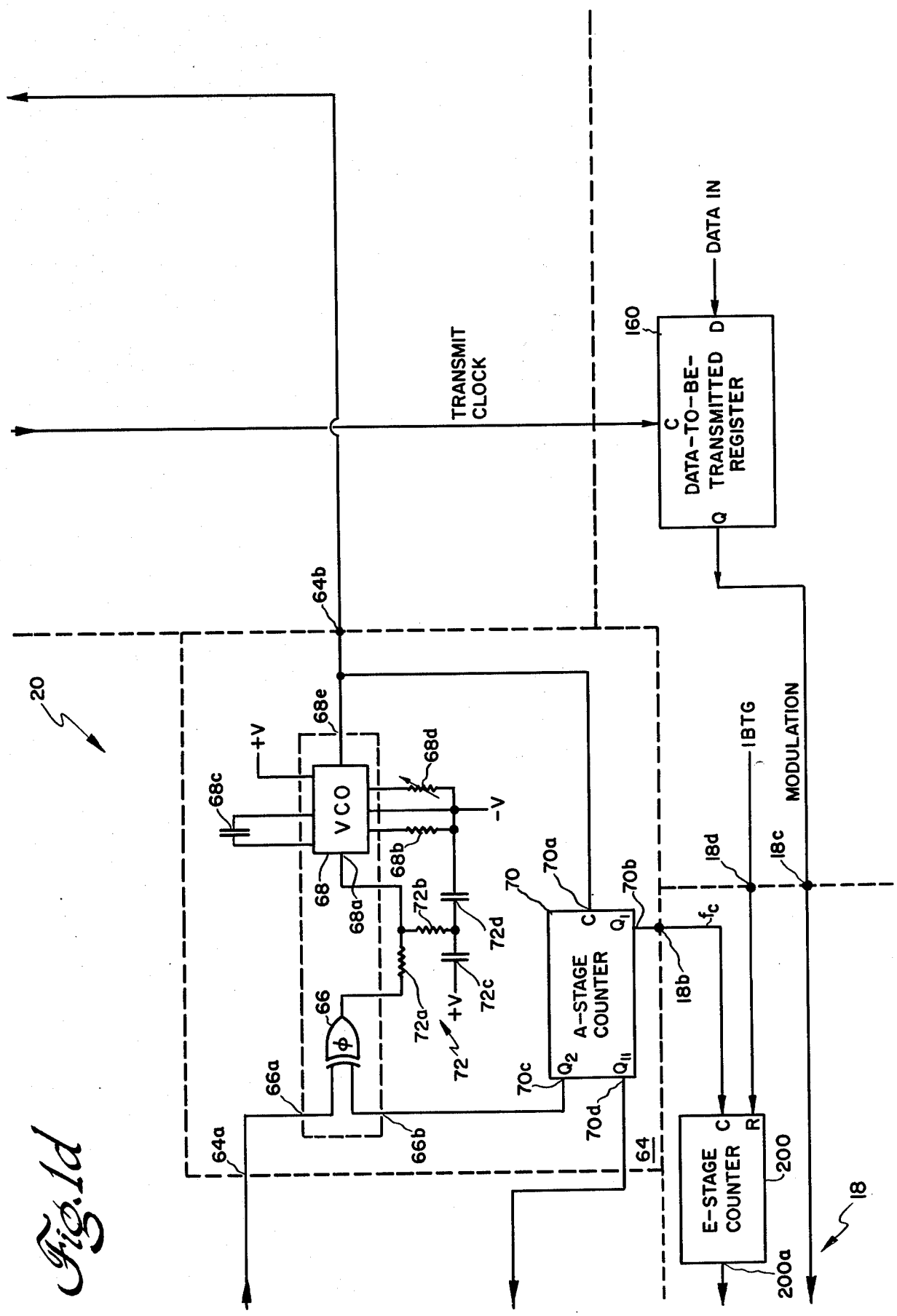

Referring to the drawings, assembled as shown in the lower right corner of FIG. 1a, transceiver 10 provides reception and transmission of a carrier waveform which is phase-shift modulated by digital data. The carrier waveform is transmitted to transceiver 10 from a central location, or transmitted from transceiver 10 to the central location, via a transmission medium, such as powerline 11 and the like. Powerline 11 is coupled to the common terminal 12a of a relay means 12, through a coupling network 14. Relay 12 is physically located within transceiver 10, while coupling network 14 may be a part of the transceiver or may be physically separated therefrom and located between the transceiver and the appropriate cables of powerline 11. Illustratively, coupling network 14 may be the coupling network 135 described in my co-pending application Ser. No. 106,452, filed Dec. 26, 1979, for coupling a signal between one energized conductor and the neutral conductor of a powerline. Relay 12 may, illustratively, be a single-pole, double-throw relay having a first selectable contact 12b coupled to the input 16a of receiver section 16, and having a second selectable contact 12c coupled to the output 18a of a transmitter section 18, responsive respectively to first and second voltage levels of an in-bound transmission gate (IBTG) signal at a relay control input 12d.

In addition to transceiver receiver section 16 and transmitter section 18, transceiver 10 includes a frequency synthesis section 20 supplying at least one signal at a frequency $f_r$ at an input 16b of receiver section 16, to determine the frequency of the received signal, and at least one signal, at another receiver section input 16c, at a frequency $f_s$ to allow the receiver to synchronize to the baud frequency of the received data bit stream, in order to facilitate recovery of the transmitted data for presentation at a receiver output 16d. Frequency synthesis section 20 also synthesizes at least one waveform having a clock frequency $f_c$ for application to a clock input 18b of transmitter section 18. The received-frequency-determining signal (at receiver input 16b), the synchronizing signal (at receiver input 16c) and the transmitter clock signal (at transmitter clock input 18b) are all advantageously synthesized as signals having a symmetric waveform, to reduce undesirable effects, such as transmitter "frequency splatter" and the like. It is desirable, in order to minimize interchannel interference in frequency-multiplexed digital communication systems, wherein a number of transceivers 10 may be simultaneously transmitting and/or receiving information on a number of individual frequency channels, to utilize channel transmit and received frequencies which are odd multiples of the frequency of a first sub-harmonic of a system-wide frequency, as disclosed and claimed in the aforementioned U.S. Pat. No. 4,101,834. In a powerline communication system, the system-wide frequency is the A.C. line voltage frequency, normally 60 Hz. in the United States. For illustratively purposes, a carrier frequency $F_S$ of 5010 Hz. is used, which is the 167-th harmonic of the 30 Hz. first sub-harmonic of the powerline frequency, i.e. $F_S=(2N+1)f_L/2$, where $f_L$ is the system-wide (powerline) frequency and N=83 in the illustrative example. The system-wide frequency may vary, e.g. the powerline frequency is specified to have a range of 59.9 Hz. to 60.1 Hz., and therefore, the transmitted and received carrier frequencies may also vary, between 5001.65 Hz. and 5018.35 Hz. for the illustrated N=83 example, by tracking the instanteous system-wide frequency. Thus, the frequencies $f_r$, $f_s$ and $f_c$ must also all track the instantaneous frequency of the system-wide waveform and the locked thereto.

To accomplish the foregoing, frequency synthesis section 20 includes a zero-crossing detector 22 receiving the system-wide frequency waveform (illustratively, a relatively low voltage powerline sinusoid, which may be derived from the secondary of a transformer in a low-voltage D.C. operating potential supply for the active devices of the circuitry to be described hereinbelow) at an input 22a thereof. Input 22a is coupled through a current-limiting resistance 24a to the non-inverting input of an operational amplifier 24, having its inverting input connected to ground potential. A pair of back-to-back protection diodes 24b and 24c, at well as a transient-shunting capacitance 24d, are connected between the inverting and non-inverting inputs of amplifier 24. The output of amplifier 24 provides a substantially square-waveform signal at the system-wide frequency e.g. nominally 60 Hz. The zero-crossing detector output waveform is connected to one input 26a of a phase detector 26, which may be formed of an exclusive-OR gate, such as is provided by a portion of a CMOS 4070 integrated circuit. A second gate input 26b receives a loop feedback signal, nominally at a frequency close to the frequency of the signal provided to reference input 26a. The output 26c of the gate provides an error signal having a magnitude responsive to the phase and frequency difference between the reference and loop feedback signals at gate inputs 26a and 26b, respectively. The phase detector error signal is filtered in a low-pass filter 28, including series resistances 28a and 28b and a filter capacitance 28c (connected from ground potential to the junction between series resistance 28a and 28b). The filtered error signal is applied to the non-inverting input of voltage follower 30. A bias resistance 28d is connected between a source of positive operating potential, of magnitude V, and the junction between the non-inverting input of amplifier 30 and filter resistance 28b. A feedback resistance 30a is connected between the inverting input and the output of amplifier 30. The output of amplifier 30 is connected, via a series charging resistance 32, to one terminal of a charging capacitance 34, having its other terminal connected to ground potential, and to the data D input of a D-type flip-flop logic element 36. The data D input of flip-flop 36 also is connected to the anode of a diode 38, having its cathode connected to the inverting $\bar{Q}$ output of the flip-flop. The true Q output of flip-flop 36 is connected to the anode of another diode 40, having its cathode connected, via a resistance 42, to the clock C input of flip-flop 36. Advantageously, the type-D flip-flop logic element may be provided by a portion of a CMOS 4013 integrated circuit and the like. Elements 32-42 act as a pulse-swallow subtractor removing, from the output transition frequency of a crystal-controlled oscillator 44, a number of transitions per second (T/sec.) as determined by the phase detector filter amplifier 30 output voltage.

Crystal oscillator 44 may be formed about a pair of series-connected inverters 44a and 44b, as available in portions of a CMOS 4011 integrated circuit and the like, with a feedback resistance 44c between input and output of first inverter 44a and a resistive voltage divider, formed of resistances 44d and 44e, connected between the output of inverter 44b and ground potential. A frequency-determining crystal element 46 is connected between the input of inverter 44a and the junction of divider resistances 44d and 44e. Illustratively, crystal element 46 is such that the substantially square waveform at the oscillator output (i.e. the output of inverter 44b) has a frequency of about 80,300 Hz., for the illustrated carrier frequency. The frequency subtraction circuitry associated with flip-flop 36 acts to reduce the oscillator frequency to the frequency $f_r$ (of about 80,139.13 T/sec., illustratively) of the waveform at the subtractor output (at the junction between diode 40 and resistance 42), which $f_r$ frequency waveform is supplied to receiver section input 16b.

The subtractor output waveform is also supplied to the input 48a of a frequency arithmetic circuit 48, which provides a waveform having twice the the number of transitions per second as the transmitter clock frequency (2$f_c$, illustratively equal to 122,880 T/sec.) at the output 48b thereof. Circuit 48 includes a first frequency divider 50 having a clock C input connected to circuit input 48a, and having an output $Q_1$ providing a waveform having one-half the number of transitions per second as the waveform at circuit input 48a. Thus, divider 50 is a divide-by-two means, which may be provided with a CMOS 4520 integrated circuit and the like) and illustratively provides a waveform with 40,069.57 T/sec. to one input 52a of a two-input exclusive-OR gate 52. The output of gate 52 is connected to both an input 54a of another two-input exclusive-OR gate 54 and to the count C input of another frequency divider 56. A waveform delay circuit 58 includes a series delay resistance 58a connected between circuit input 48a and the remaining input 54b of gate 54, and a delay capacitance 58b connected from the junction of resistance 58a and the gate input 54b, to electrical ground potential. An output $Q_4$ of second frequency divider 56 is connected to the input of a second delay network 60, having a resistance 60a connected between divider output $Q_4$ and the remaining input 52b of gate 52, and a delay capacitance 60b connected from the junction of resistance 60a and gate input 52b to ground potential. In the illustrated embodiment, second frequency dividing means 56 is a four-stage binary divider (which may be provided in a portion of the same integrated circuit utilized for providing first frequency divider means 50). Gate 52 functions as an adder, providing an output waveform having about 42740.87 T/sec. and divider means 56 provides an output waveform having about 2671.3 T/sec. Delay network 60 is utilized to assure that transitions of the second divider means 56 output waveform do not occur simultaneously with transitions of the first frequency divider means 50 output waveform, whereby adder 52 properly adds all output transitions from both frequency dividers. First delay network 58 operates in similar manner, to allow adder 54 to add the transitions of the waveforms at circuit input 48a and at the adder 52 output, whereby a non-symmetric waveform is provided at circuit output 48b (illustratively, having 122,880 transitions per second).

The output 48b waveform is applied to the input 62a of a frequency divider circuit 62, having an output 62b at which a waveform appears, with the number of transitions-per-second thereof being an integer submultiple of the number of transitions-per-second of the waveform at input 62a. The number of transitions per second of the waveform at circuit output 48b is divided, illustratively by a factor of two, in each of subsequent third and fourth frequency-dividing flip-flop logic elements 62a and 62d. The data D input of each of flip-flops 62c and 62d is connected to the inverted $\bar{Q}$ output thereof, while the clock C input of first flip-flop 62c is connected to circuit input 62a. The true Q output of flip-flop 62c is connected to the clock C input of flip-flop 62d. The true Q output of flip-flop 62d provides the output 62b of the frequency divider means 62. It will be seen that, in the illustrated embodiment utilizing a pair of sequential flip-flop logic elements, third frequency divider means 62 is a divide-by-four means, whereby the means 62 output waveform has 30,720 transitions per second, but which waveform does not have equally spaced transitions and cannot, therefore, be a pure frequency waveform and is not suitable for driving a transmitter waveform synthesizer which must have a "pure frequency" waveform input (at input 18b) if excessive transmitter frequency splatter is to be avoided.

A highly symmetric waveform, which is the "pure" clock frequency $f_c$ waveform required at transmitter input 18b, is provided by means of a phase-locked loop 64, including a phase detector means 66, a voltage-controlled oscillator (VCO) means 68 and a A-stage counter means 70. Phase detector 66 may be a two-input exclusive-OR gate, having a first input 66a receiving the output waveform from third frequency divider means 62. The output of gate 66 is connected to a frequency-controlling input 68a of the VCO through a series resistance 72a, forming a portion of a low-pass filter 72. Also included in low-pass filter 72 is a second resistance 72b connected from control input 68a to the junction between a pair of filter capacitances 72c and 72d, having remaining terminals respectively connected to positive and negative polarity operating potential supplies +V and −V, respectively. VCO 68 receives positive operating potential +V and negative operating potential −V. A nominal-operating-frequency-determining capacitance 68c is associated with the VCO, as is a frequency-adjusting variable resistance 68d and fixed resistor 68b. The phase detector gate 66 and the active portions of VCO 68 may be provided by a single CMOS 4046 and the like integrated circuit. The waveform at VCO output 68e is a squarewave, illustratively having a 122,880 Hz. frequency. The VCO output is coupled to synchronization frequency $f_s$ input 16c of receiver section 16, and is also connected to the clock C input of counter 70. Counter 70, which may be a CMOS 4040 and the like integrated circuit, includes, for the illustrative preferred embodiment, at least A×11 sequentially-connected binary divider stages. The output $Q_1$ of the first binary divider stage provides a squarewave of frequency 61,440 Hz. (for connection to transmitter clock input 18b), while the output $Q_2$ of the second stage provides a squarewave having a frequency equal to the input frequency divided by $2^2=4$, or 30,720 Hz., for connection to the remaining input 66b of the phase detector. Loop filter 72 has a relatively slow response, whereby the irregularities of the impure-frequency waveform (from third frequency divider means 62) are filtered out and the VCO output waveform is a very "pure" square waveform. Phase detector 66 functions as a type II phase detector, so that phase-lock loop 64 will always pull into lock, regardless of the nominal frequency of VCO 68. The characteristics of the third frequency divider 62 output waveform, illustratively having 30,720 transitions per second, are such that there will never be more than two positive transitions of this waveform during any one period of the waveform at the $Q_2$ output of counter 70. Therefore, phase detector 66 will cause a feedback frequency, at counter $Q_2$ output 70c, to equal the average number of transitions per second of the remaining input signal waveform, from third frequency divider means 62.

A third output 70d of the counter is taken from the output $Q_{11}$ of the eleventh stage, whereby the input frequency, e.g. 122,880 Hz., is divided by $2^{11}=2048$, to provide a highly symmetric square waveform of nominal frequency equal to 60 Hz. This waveform is coupled to input 26b of phase detector gate 26 to provide the feedback loop frequency signal compared to the system-wide waveform frequency $f_L$ for providing the error signal to frequency-subtractor pulse-swallowing flip-flop 36. With input and feedback loop waveforms of equal frequency and in phase, the output of amplifier 30 is established to be nominally at one-half the voltage between ground potential and positive supply potential +V. If the inverted $\bar{Q}$ output of flip-flop 36 is at a high level (substantially close to positive operating potential +V) diode 38 is reversed biased and capacitor 34 charges, through resistance 32, until the threshold of the data D input of flip-flop 36 is reached. At the next positive-going edge of the clock waveform, at the clock C input of flip-flop 36, the flip-flop is triggered and the true Q output thereof is clocked to the high logic level, while the inverted $\bar{Q}$ output is clocked to a low logic level. Diode 40 conducts and clamps output line 16b to a high level, preventing the next-subsequent negative transition of the oscillator 44 output waveform from occurring on this line. Therefore, a single pulse is removed from the oscillator-frequency pulse train, as transmitted to receiver input terminal 16b and frequency-arithmetic circuit input 48a. While the next-subsequent negative transition is being prevented, the transition of the inverted $\bar{Q}$ output to a low logic level forward-biases diode 38 and discharges capacitor 34 to a potential less than the data D input threshold of flip-flop 36. On the next-subsequent positive transition of the clock waveform at the clock C input, the flip-flop is reset and the clock waveform (e.g. at 80,300 Hz.) is restored to the rest of the circuitry. Capacitor 34 now starts charging back towards the output potential of amplifier 30, starting a new cycle. The values of resistor 32 and capacitor 34 are chosen such that, if the system-wide waveform and the signal fed back to phase detector input 26b are in-phase with each other, the pulse-swallowing circuit removes, on the average, the desired number of pulses per second from the oscillator output waveform, to produce the slightly lower frequency waveform required at receiver input 16b and frequency-arithmetic circuit input 48a. Illustratively, where these two inputs require a waveform having about 80139.13 transitions per second, the oscillator runs at the slightly higher frequency of 80,300 Hz. and the pulse swallowing circuit removes an average of 160.87 pulses each second. If the phase relationship between the two (nominally 60 Hz.) input signals changes, the output potential of amplifier 30 will increase or decrease to respectively increase or decrease the number of pulses per second removed by the pulse-swallowing circuit from the oscillator output waveform. Therefore, the frequency of the waveform at arithmetic circuit input 48a is adjusted such that, after division in third frequency divider 62 and application to phase-locked-loop 64, the waveform fed back to phase detector input 26b has a frequency which is exactly that of the system-wide waveform. Therefore, the frequency of the waveform at transmitter input 18b is always a fixed multiple, e.g. $2^{10} = 1024$, of the system-wide (powerline) frequency.

It should be understood that other frequency synthesis means may be utilized, such as crystal-oscillator-controlled phase-locked loop circuitry described and claimed in co-pending application Ser. No. 103,032, filed Dec. 13, 1979 herein in its entirety by reference.

Receiver section 16 includes a bandpass filter-amplifier means 74, having an input 74a connected to receiver input 16a and an output 74b. Output 74b is connected to one input 75a and 76a of first and second linear mixers 75 and 76, respectively. The input 78a of an inverter means 78 receives the bandpass filter-amplifier output signal and provides a linear inversion thereof at inverter output 78b, connected to second inputs 75b and 76b, respectively, of respective first and second mixer means 75 and 76. An output 75c or 76c, respectively, of first or second mixer means 75 or 76, is respectively connected to the input 80a or 82a of a first or second low-pass filter means 80 or 82. An output 80b of first lowpass filter means 80 is connected to a frequency-controlling input 84a of a voltage-controlled oscillator (VCO) means 84 having a second input 84b receiving the reference frequency $f_r$ waveform from receiver section input 16b. VCO 84 provides waveforms at first and second outputs 84c and 84d with frequencies selectably less than and greater than, dependent on the controlling signal at VCO input 84a, respectively the second harmonic and the fundamental of the desired channel frequency, e.g. 5010 Hz. Each of VCO means outputs 84c and 84d are coupled to an associated input 86a and 86b of a 90° phase-shift means 86, having an output 86c providing a second mixer driving waveform to second mixer control input 76d. VCO means output 84d is also connected to a first input 88a of a controlled inverter means 88, having its output 88b connected to the control input 75d of first mixer means 75. A control input 88c of controllable inverter means 88 is connected to the output 90a of a level detector means 90, having its input 90b connected to second low-pass filter input 82a. The output 82b of second lowpass filter means 82 is connected to the input 92a of an inverter amplifier means 92 having its output 92b connected to a received data input 94a of an integrate-and-dump-filter data detector 94 and to a received data input 96a of a baud synchronization means 96. The integrate-and-dump-filter detector means 94 has a synchronization signal input 94c at which a squarewave signal at half the baud frequency is provided, at an output 96b of baud synchronization means 96. For maximum data transfer consistent with minimum interchannel interference, a baud rate equal to the first sub-harmonic of the system-wide waveform frequency is utilized. Therefore, in a powerline communication system wherein the powerline frequency is nominally 60 Hz., the baud rate is 30 Hz., and the baud synchronization squarewave at detector input 94c has a frequency of 15 Hz. Baud synchronization means 96 also receives the synchronizing frequency $f_s$ waveform from receiver section input 16c, the inbound transmission (IBTG) waveform from data processing equipment located adjacent to the transceiver (not shown for purposes of simplicity) and available at receiver section input 16e, and provides a transmit clock waveform at receiver section output 16f. The transmit clock waveform is at the baud rate, e.g. 30 Hz., for use as further explained hereinbelow.

In operation, receiver section 16 receives the phase-lift-modulated carrier signal at bandpass filter-amplifier means input 74a. The bandpass filter is a relatively wide-band filter having the desired center frequency (e.g. 5010 Hz.) and a bandpass shaped such that approximately 60 dB. attenuation is achieved at a frequency approximately three times the center frequency; means 74 has an amplification which is selected such that the signal at the output 74b thereof will not be saturated at the highest amplitude of the signal expected to be received at means input 74a. Illustratively, bandpass filter-amplifier means 74 may include two cascaded stages of resistance-capacitance filters utilizing operational amplifiers 74c and 74d, respectively. The linear mixers 75 and 76, which may be implemented with single-pole, double-throw controllable solid state switches, such as provided in the CMOS 4053 integrated circuit, are switched by the signal at control inputs 75d and 76d, respectively, such that the waveforms at the respective outputs 75c and 76c alternate between the bandpass filter-amplifier means output signal and the inverse thereof at a rate established by the frequency of the control input waveform. First mixer output 75c has an amplitude responsive to the phase difference between the signal at mixer control input 75d and the signals at mixer inputs 75a and 75b. Similarly, second mixer 76 has an output waveform having an amplitude responsive to the phase difference between the signal at control input 76d and the signals at mixer inputs 76a and 76b. Second lowpass filter means 82 is a resistance-capacitance active second-order lowpass filter, utilizing an operational amplifier 83c, for removing higher frequency components of the mixer output and applying the recovered baseband data to amplifier 92. Inverter amplifier 92 utilizes an operational amplifier 92c for providing a proper polarity signal to data detector 94 and baud synchronization means 96. Additional information concerning circuitry and operation, in particular, of bandpass filter-amplifier means 74, first and second linear mixer means 75 and 76, second low pass filter means 82, inverter means 92, phase shift means 86, controlled inverter means 88 and level detector means 90, as well as general operational characteristics required of VCO means 84, detector means 94 and baud synchronization means 96, are found in my co-pending application (RD-12,122) incorporated herein in its entirety by reference. In contradistinction to the phase-shift-modulated carrier-signal receiver of the aforementioned co-pending application, receiver section 16 of my novel receiver includes several novel receiver section circuits. Received signal inverter means 78 includes operational amplifier 100 having the non-inverting input thereof connected to ground potential and the inverting input connected to the inverter means input 78a via an input resistance 101 and to inverter output 78b via a feedback resistance 102. The inverter means input and output are also connected together via a potential divider comprising series resistances 104 and 105, of substantially equal resistance magnitude. The resistance of each of resistances 104 and 105 is greater than the resistances of each of resistors 101 and 102, to prevent substantial loading upon the inverter, but to provide, at the junction between resistors 104 and 105 a signal of magnitude equal to the average between the opposite-polarity input and output signals of inverter means 78. This signal is filtered by a shunt capacitance 107, connected between ground potential and the inverting input of an operational amplifier 109, utilized in the resistance-capacitance single-pole lowpass filter of first lowpass filter means 80. The non-inverting input of operational amplifier 109 is connected to the output 75c of the first mixer, via a low-pass filter network 110 including series resistances 110a and 110b and a shunt capacitance 110c (to ground potential) from the junction therebetween. Operational amplifier feedback, between the non-inverting input of amplifier 109 and the lowpass filter output 80b, is provided by a feedback resistance 112, in parallel with a feedback capacitance 113. First lowpass filter means 80 provides the low-pass-filtered base-band signal for controlling the frequency of VCO means 84, and the connection of the operational amplifier inverting input to the filtered signal at the junction of resistances 104 and 105, decreases the amount of perturbance in the VCO frequency control signal, when the phase of the carrier is shifted during transmission of data bits. By so connecting the input and output of inverter 78 and the inverting input of amplifier 109, the necessity for additional filtering (such as providing by an additional operational amplifier circuit, designated as elements 110, 112 and 114 in the above-incorporated co-pending application Ser. No. 106,451, filed Dec. 26, 1979 is dispensed with. Both the cost and complexity of the receiver section are reduced, while the reliability of the receiver section of the present invention is improved.

The improved and simplified VCO means 84 includes a controlled switch, e.g. a 2-input NAND gate 120, having a first input 120a receiving the control signal from VCO input 84a and having its output 120b connected to one input 122a of a two-input exclusive-OR gate 122, acting as a frequency adder. The remaining input 122b of gate 122 is connected to the reference frequency input 84b of VCO means 84. The output 122c of gate 122 is connected to the clock C input of a B-stage counter means 124. In the illustrated presently preferred embodiment, counter 124 is a multiple-stage binary counter, such as provided by a CMOS 4044 integrated circuit, having at least B=11 sequentially-connected binary division stages. The output $Q_3$ of the third binary division stage (at which a waveform appears having a frequency less than the clock C input waveform frequency by a factor of $2^3=16$) is the first VCO output 84c, while the output $Q_4$ of the next counter stage (having a waveform frequency which is a factor of $2^4=16$ less than the clock C waveform input frequency) is the second VCO means output 84d. The output $Q_{11}$ of the eleventh stage of the counter provides a waveform for coupling to the remaining input 120c of gate 120, at a frequency which is less than the clock C counter input waveform frequency by a factor of $2^{11}=2048$.

In operation, and illustratively utilizing the 5010 Hz. channel carrier, VCO means input 84b receives the approximately 80139.13 transition per second waveform from synthesizer section 20. If VCO means control input 84a is at a low logic level, the signal level at gate output 120b is a high logic level and gate 122 merely inverts the waveform of the reference frequency $f_r$ input for application to the clock C input of counter 124. The first and second VCO means outputs 84c and 84d, respectively, are square waves at about 10,017.4 Hz. and 5008.7 Hz., respectively. Thus, when VCO means input 84a is a low logic level, the signal to controlled inverter input 88a is at a reference phase and at a frequency slightly less than the desired carrier frequency, while the input to second mixer control input 76d is at the same, slightly-lower frequency but at a phase 90° with respect to the phase of the waveform at first mixer control input 75d. Receipt of a slightly-low frequency waveform at first mixer input 75d causes the first mixer output 75c to increase in amplitude responsive to the phase and frequency difference between the received carrier and the signal at VCO means output 84d. This increasing-amplitude signal is filtered in first lowpass filter means 80 and provides an increasing amplitude signal at VCO input 84a. The increasing amplitude control input signal appears at gate first input 120a and eventually enables gate 120 to connect the (approximately 39.14 Hz.) waveform at counter 124 output $Q_{11}$ to first input 122a of gate 122. Gate 122 now acts as a frequency adder, having a waveform at its output 122c and at the counter clock C input, having a number of transitions per second equal to the sum of the transitions per second of the reference frequency $f_r$ waveform at VCO input 84b and the transitions per second of the counter 124 output $Q_{11}$ waveform. This increased frequency clock waveform raises the frequency of the square waveforms at VCO means outputs 84c and 84d, respectively, to about 10022.3 Hz. and about 5011.14

Hz. The control inputs 75d and 76d of first and second mixer 75 and 76, respectively, are thus provided with square wave controlling signals having 90° phase difference therebetween and a frequency (e.g. 5011.14 Hz.) slightly greater than the received carrier frequency. The amplitude of the signal at first mixer output 75c now decreases, responsive to the new frequency and phase difference between the carrier and the first mixer control signal. The decreasing amplitude signal appears at the input 80a of first lowpass filter means 80 and at VCO control input 84a. Gate 120 is eventually disabled. Thereupon, counter 124 clock input C again receives only the reference frequency $f_r$ input signal and the frequency of the mixer-driving output signals of VCO means 84 is again at a frequency slightly less than the carrier frequency. The VCO signal at output 84d is thus nominally at the frequency of the received carrier and "hunts" around a 90° phase difference therewith. By deriving the mixer control input waveform frequencies from the output waveform at the pulse swallower in frequency synthesizer 20, the "adjustment" frequency of the waveform connected to gates 122 and 120 can be made much lower, by a factor of about four, then the "adjustment" frequency utilized in the above-referenced pending application; the lower "adjustment" frequency reduces the response of the carrier phase-locked loop (including first mixer means 75, first lowpass filter means 80c VCO means 84 and controlled inverter means 88) to reduce the sensitivity of the loop to noise. The use of the low "adjustment" frequency is made possible because only the phase of the mixer control input waveforms must be corrected; the frequency variation resulting from variation in the system-wide waveform or frequency are already compensated for in frequency synthesizer means 20 (i.e. in the loop including phase detector 26, the pulse swallower associated with flip-flop 36, frequency arithmetic means 48 and 62 and loop means 64). By compensating for the system-wide waveform frequency variations within synthesizer means 20, improved performance is facilitated not only in receiver section 16, but also in the accuracy of the clock frequency $f_c$ applied to transmitter section 18.

Detector 94, as previously mentioned, receives the synchronization signal at baud synchronization means output 96b. The synchronization means includes a level detector formed of operational amplifier 130, having its inverting input connected to ground potential and its non-inverting input connected to baud synchronization means input 96a. The output of level detector 130 is connected directly to one input 132a of a two-input exclusive-OR gate 132 and is connected through a delay network 134 to the remaining gate input 132b. Delay network 134 includes a resistance 134a connected in series between the output of amplifier 130 and gate second input 132b, and a delay capacitance 134b connected from gate second input 132b to ground potential. First and second D-type flip-flop logic elements 136 and 138 have their data D inputs connected to a positive potential source and have their set S inputs connected to a negative potential source, for the disabling of the said S inputs. The count C input of first flip-flop 136 is connected to the output of gate 132, while the clock C input of second flip-flop 138 is connected to the inverted $\bar{Q}$ output of first flop-flop 136. The Q output of flip-flop 136 is connected to a filter capacitor 140 via a series filter resistance 142, while the inverted $\bar{Q}$ output of flip-flop 138 is connected to capacitance 140 via another series filter resistance 144. The reset R input of flip-flop 136 is connected via differentiation network 146, including a shunt resistance 146a and a differentiating capacitor 146b, to the input of an inverter 150. The output of inverter 150 is connected through a second differentiation network 148, including shunt resistance 148a and differentiation capacitor 148b, to the reset R input of second flip-flop 138. A local clock waveform having the nominal received data stream baud frequency, e.g. 30 Hz., is provided to both the input of inverter 150 and to differentiator network 146, from an output $Q_{12}$ of a C-stage counter means 152. Counter means 152 has a clock C input receiving a waveform of selected frequency, e.g. 122,880 Hz. In the illustrated embodiment, converter 152 is a multi-stage (C=14) binary ripple counter, such as provided by a CMOS 4020 integrated circuit, in which the output $Q_{12}$ of the twelfth binary ripple counting stage provides a local clock signal after division of the clock frequency by $2^{12}=4096$. Counter 152 also provides: a signal at the output $Q_{13}$ of the thirteenth binary counting stage, e.g. at 15 Hz. for use as the synchronization waveform at synchronizing means output 96b; an output $Q_9$ signal at the output of the ninth binary counting stage at a frequency of $2^9=512$ times less than the clock input frequency (e.g. a $Q_9$ output signal at 240 Hz. in the illustrated embodiment); and an output $Q_8$ waveform at the eighth counter stage output, at a frequency (e.g. 480 Hz.) which is a factor of $2^8=256$ less than the clock input frequency. The $Q_8$ output of counter 152 is coupled to the clock C input of a D-stage counter means 154. In the illustrated embodiment, counter 154 is a D=8 stage Johnson counter, as may be provided by a CMOS 4022 integrated circuit. A reset R input of counter 154 receives the baud clock waveform from the output of inverter 150. A counter output Q is connected to receiver section output 16f for providing a transmit clock waveform (e.g. at 30 Hz.) to a clock input C of a data-to-be-transmitted register 160, provided in the transceiver for purposes to be explained hereinbelow. The ninth stage output $Q_9$ of counter 152 is connected through a resistor 162 to a first input 164a of another 2-input exclusive-OR gate 164. The cathode of a diode 106 is also connected to gate input 164a, while the diode anode is connected to the IBTG input terminal 16e of the receiver section. The remaining input 164b of gate 164 is connected to the output of a type I phase detector 168, which may be implemented with a two-input exclusive-OR gate, forming a portion of a CMOS 4046 integrated circuit. A first phase detector input 168a receives the synchronizing frequency $f_s$ waveform provided at receiver section 16c, from synthesizer section output 64b. The remaining phase detector input 168b is connected to the output 170a of a voltage-controlled oscillator (VCO) means 170, which output 170a is also connected to the clock C input of counter 152. VCO 170 receives positive operating potential, and also receives negative operating potential. A frequency-setting potentiometer 170c and a fixed frequency setting resistor 170b are connected between negative potential and VCO 170, while a frequency-setting capacitance 172 is also connected to the VCO. A frequency controlling input 170d of the VCO is connected to the output of gate 164 via a series resistance 174a, forming a portion of a filter network 174. A network filter capacitance 174b is connected from input 170d to ground potential, while a second network resistance 174c is connected between input 170d and the output 176a of a noise-filtering buffer means 176. Buffer means 176 includes an operational amplifier 178 having its inverting input connected to ground potential and having a non-inverting input connected through a resistance 176b to the output capacitance 140 of the phase detector formed around level detector 130, gate 132 and flip-flops 136 and 138. A filter capacitance 176c is connected between the non-inverting input and the output of operational amplifier 178, to prevent amplifier 178 from switching on noise when the potential on the non-inverting input is near zero volts.

In operation, the baud synchronization phase detector (including elements 130, 132, 136, 138 and 150 and the circuitry associated therewith) receives the recovered baseband data and, briefly, squares up the input 96a waveform in level detector 130, for application to gate 132. Input waveform transitions are immediately applied to first gate input 132a and are delayed, by delay circuit 134, for application to gate input 132b. A positive pulse thus appears at the clock C input of flip-flop 136 for each input waveform transition. When data is transmitted, phase transitions occur only when a transmitted bit of a first binary data value is followed by a subsequently-transmitted data bit having a different, second binary value. Transitions do not occur when two successive data bits have the same binary data value. The transmission by phase-shift modulation of a binary 1 data bit therefore causes a pulse to be coupled to the clock C input of flip-flop 136 to set the Q output thereof to a high logic level while simultaneously setting the $\bar{Q}$ thereof to a low logic level. At the next positive-going transition of the local clock waveform, at the input of inverter 150, flip-flop 136 is reset and the $\bar{Q}$ output thereof rises to clock second flip-flop 138 and set the $\bar{Q}$ output thereof to a low logic level. At the next negative-going transition of the local clock waveform, the baud clock waveform at the output of inverter 150 provides a positive-going transition, which is differentiated in network 48, causing flip-flop 138 to reset and restore the $\bar{Q}$ output thereof to a high logic level. Integrating capacitor 140 is thus charged toward the high logic level voltage, through charging resistor 142, during the time that the Q output of flip-flop 136 is at the high logic level and the increasing positive voltage across capacitor 140 has a change in amplitude which is established by the timing difference between the recovered baseband waveform transition producing the pulse at the output of gate 132, and the next-subsequent positive transition of the local clock waveform at the input of inverter 150. The low logic level at the $\bar{Q}$ output of flop-flop 138 is present for exactly one-half of a local clock waveform cycle and, during the substantially constant time interval, integrating capacitor 140 is charged towards a low logic level through charging resistance 144. The voltage across capacitor 140 thus decreases by a substantially constant amount. If the local clock signal, at the input of inverter 150, is synchronized with the received baseband waveform transitions, at synchronization means input 96a, the Q output of flip-flop 136 will be enabled for exactly the same amount of time that the $\bar{Q}$ output of flip-flop 138 is enabled, causing no net voltage change across filter capacitor 140 and being indicative of exact synchronization of the local clock and recovered baseband waveform transitions. If exact synchronization does not occur, the pulses at the output of gate 132 will appear either before or after the negative transitions of the local clock waveform and charge capacitance 140 to a more positive or negative level, respectively. The voltage across capacitor 140 is compared, in comparator 176, to ground potential and provides a voltage at comparator outout 176a which is above ground potential (positive polarity) if the local clock frequency is less than the frequency of the received data bit stream transitions and is below ground potential (negative polarity) if the local clock frequency is greater than the received data bit stream transition frequency. Additional information as to the operation of the baud synchronizer phase detector may be found in the aforementioned co-pending application.

The voltage at level detector output 176a is utilized to change the frequency of VCO 170 to provide the baud synchronization output signal, at output 96b (and illustratively at 15.0 Hz.) required by the receiver data detector 94. The frequency of VCO 170 is also controlled by the signal at the output of gate 164, which is a function of the synchronization frequency $f_s$ signal at receiver section input 16c, and the frequency at output $Q_9$ of counter 152. In order to properly phase the (15 Hz.) waveform at baud synchronization means output 96b, feedback from counter 152 is utilized. Baud synchronization means 96 functions with VCO 170 oscillating at the same frequency (e.g. 122,880 Hz.) as the synchronization frequency $f_s$ signal from synthesizer section 20. The synchronization frequency signal and the VCO output signal are each applied to separate input leads of the type I phase detector 168 and the frequency-phase difference signal at the output thereof appears at gate second input 164b. The VCO output signal is divided by a preselected factor (e.g. $2^9 = 512$) in counter 152 and is applied, via resistor 162, to the remaining input 164b of gate 164. This sub-harmonic of the VCO signal (e.g. at 240 Hz.) reverses the polarity of the phase-lock loop at a rate equal to the frequency of the sub-harmonic signal and causes the loop to change the phase relationship between the signals at phase detector inputs 168a and 168b. Thus, each time the polarity of the signal at gate input 164a changes, the nominal frequency of phase-lock loop will be advanced or retarded by 180° in phase. Direction of the phase change will depend upon the phase offset of the two signals at phase detector inputs 168a and 168b. If the signals are exactly 90° out of phase, with the output of phase detector 168 being zero, neither advancement nor retardation is favored. If, however, there is a phase offset, either advancement or retardation will be favored, dependent upon the polarity of offset. Such an offset is introduced by applying the level detector output 176a voltage to the loop filter, and hence to VCO input 170d. By proper selection of the polarity of this voltage, the phase of the local clock waveform, and hence of the synchronizing waveform at output 96b, will be advanced or retarded until that waveform is in-phase with the received data bit stream transitions.

The preceding description of operation of synchronization means 96 takes place in the received mode, with the IBTG signal at receiver section input 16e at a low logic level, whereby diode 166 is reversed biased. When transmitter section 18 is to be operated, as hereinbelow described, the IBTG signal assumes a high logic level and diode 116 is forward biased, clamping gate first input 164a to the high logic level and removing the feedback thereto of the $Q_9$ output waveform of counter 152. This action prevents any adjustment of phase of the transmit clock, also derived from synchronization means 96, during transmit operation, thus preventing data transmission errors due to changes in transmit clock timing.

The baseband data signal appears at the input 94a of detector means 94. Illustratively, the baseband signal has a baud frequency of 30 Hz., while the detector synchronizing waveform, at detector input 94c, is a squarewave at one-half the frequency, e.g, 15 Hz., of the baseband data signal. Detector 94 includes first and second integrators 181 and 182, each having a series integration resistance 181a and 182a, having a first terminal thereof connected to detector means input 94a. The remaining terminal of each integration resistance 181a and 182a is connected to a first terminal of respective integration capacitances 181b and 182b, each having the remaining terminal thereof connected to ground potential. The output of each integrator network, at the junction between the resistance and capacitance elements thereof, is connected to an associated selectable contact terminal 184a and 184b, respectively, of a single-pole, double-throw switch means 184. The switch means (which may be an electronic switch as provided by a CMOS 4053 integrated circuit and the like, or may be mechanical or electromechanical in nature) has the common terminal 184c thereof connected to ground potential through a discharge resistance 186. A switch means control input 184d receives the signal at detector means synchronization input 94c for controlling the switch means to complete contact between common terminal 184c and second selectable terminal 184b when control input 184d is at a high logic level, and to connect common terminal 184c to first selectable terminal 184a when the control signal at input 184d is at a low logic level. An operational amplifier 188 has its inverting and non-inverting inputs respectively connected to first and second selectable switch means terminals 184a and 184b, respectively. The output of operational amplifier 188 is connected to a first input of a two-input exclusive-OR gate 190, having its remaining input receiving the synchronization signal from detector means synchronization input 94c. The output of gate 190 is connected through a lowpass filter 192, having a series resistance 192a and a shunt filter capacitance 192b, to detector means output 94b, and thence to receiver recovered data output 16d.

In operation, the recovered baseband data waveform is applied to the integrate-and-dump-filter detector means input 94a. During each bit time interval, the baseband waveform is integrated in only one of integrators 181 and 182. The remaining integrator is discharged, through resistance 186, responsive to the contact closure position of switch means 184. As switch means 184 is controlled by the synchronization waveform, having a frequency exactly equal to one-half the received data bit stream frequency, integration in, e.g. first integrator 181 (as illustrated) commences at the start of a particular bit time interval, coincident with a transition of the synchronization waveform and discharge of the second integrator 182. Thus, while the synchronization waveform is at a high logic level, integrator 182 is discharged through resistance 186, while the voltage across first integrator capacitor 181 is established by the low-pass filtered error voltage from second mixer output 76c. This error voltage will be a low logic level if the phase of the carrier for the presently-received data bit time interval is of the same phase as the phase of the carrier during a preceding data bit time interval, indicative of a logic zero. Conversely, if the phase of the carrier during the present data bit time interval has shifted 180° from the phase of the carrier during the preceding bit time interval, a logic one is being transmitted and a phase error signal of relatively large magnitude is received and integrated in that one of integrators 181 and 182 then operative. The voltage level across the integration capacitance of the operative filter, e.g. capacitance 181b of filter 181, has the value of the data bit being transmitted, at the end of the bit time interval, coincident with the next transition of the synchronizing signal at detector means input 94c. Operational amplifier 188 will always have one of its inputs connected to ground potential through the relatively low-magnitude discharge resistance 186, and will have the remaining input receiving the output of the associated integrator. Therefore, operational amplifier 188 operates as a level detector, providing an output signal of magnitude responsive to the binary value of the received data bit, but undergoing output level inversion for every other data bit time interval. That is, when the non-inverting input of amplifier 188 is connected to ground through discharge resistor 186, reception of a low logic level data bit causes a minimum change in the error voltage at mixer output 76c, whereby a low logic level input from integrator 181 is obtained and causes amplifier 188 to provide a high logic level output. If during that same bit time interval, a high logic level data bit (180° phase shifted carrier) was received, a large change in error voltage at mixer output 76c occurs. A high logic level output is obtained at the output of integrator 181, and causes amplifier 188 to output a low logic level signal. When the inverting input of amplifier 188 is connected to ground potential through discharge resistance 186, reception of a low logic level data bit causes the integrator and amplifier output voltages to be at a low logic level, while reception of a high logic level data bit causes the voltage across second integrator capacitance 182b to be at a high logic level and the amplifier output voltage to also be at a high logic level. Accordingly, the amplifier output voltage is exclusive-OR'd with the synchronization logic level, in gate 190, so that a second inversion of the received data bit logic level occurs, whereby after low-pass filtering, the output of this complementary integrate-and-dump-filter detector is a high logic level whenever a phase change occurs in a presently-received data bit, with respect to phase of the carrier during the bit time nterval of the previous data bit, and a low logic level output occurs whenever the phase of the carrier is constant from the immediately previous data bit time interval to the present bit time interval.

The data to be transmitted is provided (from data processing circuitry not shown for reasons of simplicity) to the data D input of register 160 prior to transmission. At the time of transmission, each of the data bits stored in register 160 sequentially appears at the Q output thereof responsive to successive positive transitions of the transmit clock waveform appearing at the clock C input of the register. The serial data bit waveform is coupled to the modulation input 18c of transmitter section 18. In the automatic meter reading and control system in which transceiver 10 is illustratively used, the received and transmitted data is, by convention, in baud synchronization on the powerline transmission medium. Due to the delay in receiver section 16 (substantially due to filter delays in bandpass filter-amplifier 74 and in low-pass filters 80 and 82) the receiver section local and baud clock signals, respectively, at the input and output of inverter 150, would not normally be in proper phase with the transmit clock signal. Johnson counter 154 is utilized to provide the necessary phase difference to bring the received carrier and transmitted carrier signals into baud synchronization. Counter 154 provides a multiplicity D of output signals, each having a frequency less than the frequency at clock C input by a factor D, and each having a phase which is (360/D) degrees different from the phase of adjacent output signals. The counter output Q waveform actually used for the transmit clock is selected from the D different outputs available; once selected for one transceiver, the same output phase is utilized all for all transceivers in the same system. Thus, counter 154 illustratively has D=8 stages, whereby the 480 Hz. signal at the clock C input is divided by D=8 and normally produces D=8 different outputs, each having a pulse train appearing at (480/8=) 60 pulses per second, with each pulse having a duration of 1/480 of a second. These outputs are shifted in phase, with respect to each other, such that no two outputs are producing a pulse at the same time. That output having a pulse train most nearly approximating the desired timing for the transmit clock is selected. The reset R input of counter 154 receives the baud clock signal from the output of inverter 150, whereby the counter is reset for half the baud clock period and the selected Q output becomes a 30 Hz. train of pulses, with each pulse having a 1/480 of a second duration, as required for the transmit clock. Thus, the transmit clock is provided with the proper phase relationship, within the nearest 1/16-th of a baud cycle.

Transmitter section 18 includes a E-stage counter 200 having a clock C input receiving the clock frequency $f_c$ waveform at transmitter input 18b. Counter 200 also has a reset R input receiving the IBTG waveform from transmitter section input 18d. Each of the E stages of the counter provides a separate output line at counter output 200a, with each of the E output lines being connected to an associated one of E address lines at an address port 202a of a read-only memory (ROM) means 202. The read-only memory stores data which, as counter 200 is cyclically and sequentially caused to count through the entire sequence of ROM addresses, outputs a cyclic sequence of data words, each of F bits, representing a step-wise approximation of a pseudo-bandpass-filtered carrier frequency waveform of a preselected frequency, which is an odd multiple of the first sub-harmonic of the system-wide frequency $S_Z$. The F parallel data output lines of ROM output 202b are each connected to an associated one of F input lines at the input 204a of a digital-to-analog converter (DAC) means 204. The DAC analog output 204b is therefore an analog voltage which is the step-wise representation of the pseudo-bandpass-filtered carrier waveform. This analog waveform is connected to the input 206a of a low-pass filter means 206, which removes higher frequency components therefrom to provide a smooth pseudo-bandpass-filtered sinusoidal carrier waveform at the output 206b thereof. The carrier waveform is applied to the carrier input 208a of a controlled inverter means 208 which also receives the modulation waveform at a modulation input 208b, from transmitter section modulation input 18c. Because counter 200 remains reset when the IBTG signal is at a low logic level, the counter commences counting at a count of zero when the IBTG waveform transitions to a high logic level, coincident with the transition of the transmit clock causing modulation information to appear at inverter input 208b. Thus, the carrier waveform commences at the start of the bit time interval of the first data bit to be transmitted and, as each cyclic count through all of the counting stage of counter 200, occurs in one data bit time interval, produces a carrier waveform, during the present bit time interval, which is a mirror image of the carrier waveform produced during a previous bit time interval, with respect to the bit time interval termination time therebetween. Thus, inverter 208 allows passage of the low-pass-filtered carrier waveform, from input 208a to output 208c, whenever a change in modulation logic level occurs at the transition time between two successive bit time intervals, to transmit a 180° phase-shifted carrier waveform, and inverts the input waveform for a full bit time interval, whenever the modulation waveform at input 208b does not include a transition at the transition time between two successive bit time intervals, to transmit a 0° phase-shifted carrier waveform. The phase-shift-modulated pseudo-bandpass-filtered carrier waveform at inverter output 208c is applied to the input 210a of a linear amplifier 210. An amplifier output 210b is connected to the transmitted carrier output 18a of the transmitter section. The transceiver relay means 12, having received an IBTG high logic level at the commencement of transmission, connects selectable contact 12c to common contact 12a and outputs the transmitted carrier waveform to coupling network 14 for coupling onto the transmission media (powerline 11). At termination of data transmission, the IBTG waveform returns to a low logic level and: resets counter 200, controls relay means 12 to connect the powerline transmission media 11 and coupling network 14 to the input receiver section 16; and removes the clamp from first input 164a of gate 164, allowing synchronization means 96 to synchronize the receiver for data reception. Additional information concerning the design and operation of transmitter section 18 may be found in my co-pending application Ser. No. 106,452, filed Dec. 26, 1979, incorporated herein in its enirety by reference. It should be understood that relay means 12 may be removed, and the transmitted carrier frequency may be spaced from the received frequency, whereby full duplex operation of the transceiver is facilitated.

The transceiver of the present invention provides increased simplicity of circuitry, and lower cost in addition to improved performance features, including additional suppression of received noise and speed of synchronization, relative to the use of a separate receiver, transmitter, and frequency synthesizer of the aforementioned co-pending applications.

While the present invention has been described with respect to one presently preferred embodiment thereof, many variations and modifications will now become apparent to those skilled in the art. It is my intent, therefore, to be limited only by the scope of the appending claims and not by the specific detail presented herein.

What is claimed is:

1. A transceiver for use in a system communicating digital data over a preselected transmission medium by phase-shift-modulation of a carrier waveform having a frequency related to the frequency of a system-wide waveform, comprising:

a transmitter section having an input receiving a clock frequency waveform, another input receiving a transmit clock waveform and an output, and including means for synthesizing a pseudo-bandpass-filtered waveform having said carrier frequency, responsive to receipt of said clock frequency waveform;

means receiving at least one bit of digital data to be transmitted for storing said data and for sequentially providing each successive data bit at an output thereof responsive to an associated one of successive portions of said transmit clock waveform;

means receiving the at least one data bit from said storing means output for modulating the phase shift of the carrier frequency waveform responsive to the digital value of the data bit to be then transmitted; and means for amplifying the amplitude of the phase-shift-modulated, pseudo-bandpass-filtered carrier frequency waveform and coupling the amplified carrier waveform to said transmitter section output;

a receiver section having an received carrier input, a reference signal input and a recovered data output, said receiver section including means connected to said received carrier and reference signal inputs for providing a baseband data signal having each of a plurality of amplitude transitions thereof responsive to an associated reversal of the phase of the waveform of said received carrier;

means receiving said baseband data signal for generating a baud synchronization signal having periodic amplitude transitions synchronized to the transitions of said baseband data signal; and means receiving said baud synchronization and baseband data signals for recovering the digital data modulated onto said received carrier waveform, and providing said recovered digital data at said receiver section recovered data output;

means for generating said transmit clock waveform with a preselected frequency and phase relationship to the waveform of said baud synchronization signal; and a frequency synthesizer section having an input receiving said system-wide waveform and including means for generating said clock frequency waveform for said transmitter section; and means for generating said reference signal for said receiver section.

2. The transceiver as set forth in claim 1, wherein said reference signal generating means includes:

means for providing a first reference waveform having zero crossings coincident with the zero crossings of the system-wide waveform;

first phase detector means receiving said first reference waveform and a first loop waveform for providing an output signal having an amplitude responsive to the phase difference between said first reference and first loop waveforms;

oscillator means for generating a waveform having a frequency greater than the frequency of the waveform of said reference signal;

pulse-swallower means for subtracting transitions from said oscillator means waveform to provide the waveform of said reference signal having a preselected number of transitions per second, the number of transitions subtracted from said oscillator means waveform being established responsive to the amplitude of said first phase detector means output signal;

frequency-arithmetic means for providing a second reference waveform having a transition frequency equal to a first integer multiple of said system-wide waveform frequency;

second phase detector means receiving said second reference waveform and a second loop waveform for providing an output signal having an amplitude responsive to the phase difference between said second reference and second loop waveforms;

means for generating an essentially square waveform having a frequency responsive to the amplitude of said second phase detector output signal and which square waveform frequency is a second integer multiple of said system-wide waveform frequency; and means for dividing the frequency of said output square waveform of said generating means by said second integer multiple to provide the first loop waveform to said first phase detector means and also for dividing said waveform generating means output waveform frequency by first integer multiple to provide said second loop waveform to said second phase detector means.

3. The transceiver as set forth in claim 2, wherein said clock frequency waveform generating means includes means for dividing said generating means output square waveform by a third integer multiple to provide the clock frequency waveform to said transmitter section.

4. The transceiver as set forth in claim 2, wherein said first phase detector means includes means for low-pass filtering the output signal thereof.

5. The transceiver as set forth in claim 2, wherein said pulse-swallower means includes:

a flip-flop logic element having a true Q output and an inverted $\bar{Q}$ output, a data input and a clock input receiving the oscillator means waveform, the logic states of said Q and $\bar{Q}$ outputs being complimentary and controlled by the signal at said data input being greater than or less than a data input threshold voltage when a preselected polarity transition of the oscillator means waveform occurs at said clock input;

means for integrating the first phase detector means output signal to apply a voltage to said data input of said flip-flop logic element;

a first unidirectionally-conducting device having an anode connected to said data input and a cathode connected to said $\bar{Q}$ output;

a second unidirectionally-conducting device having an anode connected to said Q output and a cathode; and a resistance element connected between the second device cathode and said clock input;

said reference signal waveform being provided at said second device cathode.

6. The apparatus as set forth in claim 2, wherein said oscillator means includes a crystal element for controlling the frequency thereof.

7. The transceiver as set forth in claim 2, wherein said frequency-arithmetic means includes:

first frequency divider means for providing a waveform having a number of transitions per second which is an integer sub-multiple of the number of transitions per second of said reference signal waveform;

first frequency adder means for providing an output waveform having a number of transitions per second equal to the sum of the transitions per second of said first frequency divider means waveform plus the number of transitions per second of another waveform;

second frequency divider means for providing an output waveform having a number of transitions per second which is an integer submultiple of the first frequency adder means output waveform, said second frequency divider means output waveform being said another waveform applied to said first frequency adder means; and second frequency adder means for providing an output waveform having a number of transitions per second equal to the sum of the number of transitions per second of said first frequency adder means output waveform plus the number of transitions per second of said reference signal waveform.

8. The transceiver as set forth in claim 7, wherein at least one of said integer sub-multiples for said reference signal and first adder means waveforms is by division of that waveform by an integer power of base 2.

9. The transceiver as set forth in claim 7, further including third frequency divider means for providing an output waveform having a number of transitions per second which is another integer submultiple of the number of transitions per second of the output waveform of said second frequency adder means, the output waveform of the third frequency divider means being said second reference waveform.

10. The transceiver as set forth in claim 7, further comprising first means for delaying transitions of said second frequency divider means output waveform to cause the transitions of said first and second frequency divider means output waveforms to occur at different times at said first frequency adder means.

11. The transceiver as set forth in claim 7, further including second means for delaying transitions of said reference signal waveform to cause the transitions of said reference signal and said first frequency adder means output waveforms to occur at different times at said second frequency adder means.

12. The transceiver as set forth in claim 2, wherein said square waveform generating means includes a voltage-controlled oscillator having said square waveform at an output thereof at a frequency responsive to the magnitude of a voltage at a control input; and means for low-pass filtering the second phase detector means output signal for application to said voltage-controlled oscillator control input.

13. The transceiver as set forth in claim 2, wherein at least one of said first, second and third integer multiples is by multiplication by a positive integer power of base 2.

14. The transceiver as set forth in claim 1, wherein the number of baud synchronization signal transitions is one-half of the maximum possible number of baseband data signal transitions, and said digital data recovering means comprises: first and second integrators each having an input receiving said baseband data signal and an output; means for alternatingly connecting one of the first and second integrator outputs substantially to ground potential responsive to said baud synchronization signal alternating between first and second logic levels; a differential amplifier having inverting and non-inverting inputs respectively connected to an associated one of the first and second integrator outputs, and having an output at which a signal appears with amplitude responsive to the amplitude of the integrated baseband data signal and with polarity established by the connection to substantially ground potential of the remaining one of said first and second integrator means outputs; means having a first input receiving the output of said amplifier and having a second input receiving said baud synchronization signal for selectively inverting the amplifier output signal amplitude when said baud synchronization signal is at that one of said first and second logic levels causing said amplifier to provide the output signal thereof with a negative polarity; and means for low-pass filtering the output of said inverting means to provide the recovered digital data signal at the receiver section recovered data output.

15. The transceiver as set forth in claim 14, wherein said first and second integrators are resistance-capacitance integration networks.

16. The transceiver is set forth in claim 1, wherein said baud synchronization signal generating means comprises phase detector means receiving said baseband data signal and a local clock waveform for providing an output signal having an amplitude responsive to the phase difference therebetween; a voltage-controlled oscillator having a control input and an output at which a square waveform is generated with frequency established by the magnitude of a signal at said control input; counter means receiving the output waveform of said voltage-controlled oscillator for providing said local clock waveform, said baud synchronization signal and a third signal respectively at first, second and third integer submultiples of said voltage-controlled oscillator output waveform frequency; another phase detector means receiving said voltage-controlled oscillator output waveform and a synchronization waveform which is an integer multiple of said clock frequency waveform applied to said transmitter section, for providing an output waveform having an amplitude responsive to the phase difference therebetween; frequency adder means for providing an output waveform having a frequency equal to the sum of the frequencies of said another phase detector output waveform and the counter means third signal waveform; and means receiving the output waveforms from said first phase detector means and from said frequency adder means for providing a voltage to said voltage-controlled oscillator control input to cause said baud synchronization signal to have transitions concurrent with the transitions of said baseband data signal.

17. The transceiver as set forth in claim 16, wherein said baud synchronization signal generating means further includes means connected to said frequency adder means for preventing the application of said counter means third signal waveform thereto only when said transceiver is transmitting digital data.

18. The transceiver as set forth in claim 17, wherein said counter means also provides a fourth output waveform at a fourth integer submultiple of said voltage-controlled oscillator output waveform frequency; and said transmit clock waveform generating means includes Johnson counter means receiving said counter means fourth output waveform at a clock input thereof and the inverse of said local clock waveform at a reset input thereof for providing, during one-half of the total time interval of said local clock signal, a plurality D of mutually-exclusive outputs each at a frequency D times less than the frequency of said counter means fourth output waveform and each present in mutually exclusive manner with respect to all of the remaining outputs of said Johnson counter; a selected one of said D outputs being said transmit clock waveform for connection to said transmitter section data storing means.

19. The transceiver as set forth in claim 16, wherein said frequency adder is an exclusive-OR gate having a first input receiving the output of said another phase detector means and having a second input receiving said counter means third output waveform, and having an output at which said waveform having a frequency equal to the sum of said input frequencies appears.

20. The transceiver as set forth in claim 16, wherein said another phase detector means is an exclusive-OR gate having a first input receiving the output waveform from said voltage-controlled oscillator and a second input receiving said synchronization waveform at said integer multiple of said clock frequency, and having an output at which said signal of amplitude responsive to the phase difference between the signals at the first and second inputs appears.

21. The transceiver of claim 1, wherein said baseband data signal providing means comprises: amplifier means for bandpass filtering the carrier waveform received at said receiver section input; means for generating a first error signal of amplitude responsive to a difference in phase between the bandpass-filtered carrier signal and a first signal at a frequency equal to said carrier frequency; phase-locked loop means receiving said reference signal waveform from said frequency-synthesizer section and said bandpass-filtered carrier signal for generating said first signal at a frequency locked to said carrier frequency; and means for low-pass filtering said first error signal to recover said baseband data signal.

22. The transceiver as set forth in claim 21, wherein said phase-locked loop means includes oscillator means receiving said reference signal waveform for generating a square waveform output of frequency controlled by the amplitude of a control signal at an input thereof; means for selectively inverting the sqaure waveform output of said generating means responsive to the level of said first error signal; means for generating a second error signal of amplitude responsive to a difference in phase between the selectively inverting means output square waveform and the bandpass-filtered carrier waveform; and means for low-pass filtering said second error signal to provide said control signal at said generating means control input for locking the frequency of said generating means to the frequency of the received carrier waveform.

23. The transceiver as set forth in claim 22, wherein said oscillator means includes counter means receiving an input waveform at an input frequency for providing a first output signal at a frequency which is a first integer sub-multiple of the input frequency, for connection to said selectively inverting means, and for providing a second output signal having a frequency which is a second integer sub-multiple of said input frequency; frequency adder means receiving said reference signal waveform, said counter means second output signal and said control input signal for providing to said counter means input a waveform having the frequency of said reference signal when the amplitude of the said error signal at said control input is less than a predetermined level and at a frequency equal to the sum of said reference signal and counter means second output signal frequencies when said control input amplitude is greater than said predetermined level.

24. The transceiver as set forth in claim 23, wherein said frequency adder means comprises a logic gate having a first input receiving said control signal, a second input receiving said counter means second output signal, and an output at which a waveform having the same frequency as the frequency of said counter means second output signal appears only when said control input signal exceeds said predetermined level; and an exclusive-OR gate having a first input connected to the output of said logic gate, a second input receiving said reference waveform, and an output at which said sum signal appears to connect to the input of said counter means.

25. The transceiver as set forth in claim 22, wherein said selectively inverting means receives the output of said first error signal generating means for providing a logic signal respectively at first and second states responsive respectively to said first error signal having first and second polarities, and an exclusive-OR gate having a first input receiving said counter means first output signal, a second input receiving the output of said level detecting means, and an output at which said selectively inverted output square waveform appears.

26. The transceiver as set forth in claim 22, wherein said second error signal generating means comprises means for inverting the polarity of said bandpass-filtered carrier waveform; and a linear mixer having first and second inputs respectively receiving the bandpass-filtered carrier waveform and the inverted polarity bandpass-filtered carrier waveform, and having another input receiving said selectively inverting means output square waveform, and an output at which said second error signal appears.

27. The transceiver as set forth in claim 26, wherein said inverting means includes an input, an output and first and second resistance elements of essentially equal magnitude, connected in series between said input and output of said inverting means; and said second error signal low-pass filtering means is a resistance-capacitance active low-pass filter including an operational amplifier having an inverting input connected to the junction between said first and second resistance elements.

28. The transceiver as set forth in claim 26, wherein said first error signal generating means comprises means for shifting the phase of said phase-locked loop generating means square output waveform by 90°; and a linear mixer having first and second inputs respectively receiving the bandpass-filtered carrier waveform and the inverted polarity bandpass-filtered carrier waveform, a control input receiving the 90° phase-shifted square waveform, and an output at which said first error signal appears.

29. The transceiver as set forth in claim 1, further including means for selectively coupling said transmission medium to said transmitter section output only when data is to be transmitted, and for selectively coupling said transmission medium to said receiver section input at all other times.

30. The transceiver as set forth in claim 1, wherein different frequency carriers are transmitted by said transmitter section and received by said receiver section, and wherein said transceiver is adapted for operation in a full-duplex mode.

\* \* \* \* \*